(12) United States Patent
Muncy et al.

(10) Patent No.: US 10,303,744 B2
(45) Date of Patent: May 28, 2019

(54) SYSTEMS AND METHODS FOR GENERATING AND CONFIGURING CONTENT OF ELEVATOR DESTINATION DISPATCH KIOSKS

(71) Applicants: ThyssenKrupp Elevator AG, Essen (DE); thyssenkrupp AG, Essen (DE)

(72) Inventors: Matthew Muncy, Germantown, TN (US); Sean Luis Stecker, Marietta, GA (US); Chih Hung King, Sharpsburg, GA (US)

(73) Assignees: THYSSENKRUPP ELEVATOR AG, Essen (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 15/495,904

(22) Filed: Apr. 24, 2017

(65) Prior Publication Data

US 2018/0307655 A1    Oct. 25, 2018

(51) Int. Cl.
*G06F 17/21* (2006.01)
*G06F 3/0488* (2013.01)
(Continued)

(52) U.S. Cl.
CPC ............ *G06F 17/212* (2013.01); *B66B 1/463* (2013.01); *B66B 3/00* (2013.01); *B66B 19/00* (2013.01);
(Continued)

(58) Field of Classification Search
CPC ... G06F 17/212; G06F 3/0488; G06F 3/04886
See application file for complete search history.

(56) References Cited

U.S. PATENT DOCUMENTS

| 5,422,809 A | 6/1995 | Griffin et al. |
| 7,347,303 B2 | 3/2008 | Kontturi et al. |

(Continued)

FOREIGN PATENT DOCUMENTS

| DE | 102014115999 A1 * | 5/2016 | |
| EP | 2669234 A1 * | 12/2013 | ............. B66B 1/463 |

(Continued)

OTHER PUBLICATIONS

Adam Parrish, Windows Icon Sizes—Simple Guide to Windows Icons (ICO), Nov. 1, 2011, Creative Freedom, 1-21 pages.*

(Continued)

*Primary Examiner* — Scott T Baderman
*Assistant Examiner* — Seung Woon Jung
(74) *Attorney, Agent, or Firm* — Lathrop Gage L.L.P.

(57) ABSTRACT

A computer-implemented method for generating and configuring content of an elevator destination dispatch kiosk. The kiosk includes a display. The method includes creating a kiosk database having kiosk data. The kiosk data outlines a plurality of destination floors associated with the elevator destination dispatch kiosk. The method comprises the step of using a computing structure remote from the elevator destination dispatch kiosk to automatically: (a) access the kiosk data in the kiosk database, and (b) generate a floor button layout. The method includes the step of communicating the floor button layout from the computing structure to the elevator destination dispatch kiosk to cause the floor button layout to be published on the display. An interface of the computing structure allows the floor button layout to be previewed before the floor button layout is communicated from the computing structure to the elevator destination dispatch kiosk.

18 Claims, 11 Drawing Sheets

(51) Int. Cl.
    *G06F 3/0484* (2013.01)
    *B66B 19/00* (2006.01)
    *B66B 1/46* (2006.01)
    *B66B 3/00* (2006.01)

(52) U.S. Cl.
    CPC ........ *G06F 3/0488* (2013.01); *G06F 3/04845* (2013.01); *B66B 2201/103* (2013.01); *B66B 2201/4615* (2013.01)

(56) References Cited

U.S. PATENT DOCUMENTS

| | | | |
|---|---|---|---|
| 8,157,059 | B2 | 4/2012 | Takeuchi et al. |
| 2009/0294221 | A1* | 12/2009 | Bahjat .................. B66B 1/463 187/396 |
| 2015/0045956 | A1 | 2/2015 | Joyce et al. |
| 2016/0092405 | A1* | 3/2016 | Lee .................. G06F 17/212 715/202 |

FOREIGN PATENT DOCUMENTS

| | | | |
|---|---|---|---|
| JP | 2013119438 | A | 6/2013 |
| JP | 2015013695 | A * | 1/2015 |
| JP | 5956024 | A | 1/2017 |
| WO | 2013012409 | A1 | 1/2013 |
| WO | 2016202644 | A1 | 12/2016 |

OTHER PUBLICATIONS

Art. Lebedev Studio, Optimus Configurator User Manual, Feb. 22, 2014, Art. Lebedev Studio, 1-15 pages.*
Touch-To-Go Technologies, Elevator Touchscreen Systems 2016 product catalog, Apr. 5, 2016, XP055484615.
PCT Application No. PCT/EP2018/060126, International Search Report and Written Opinion, dated Jul. 10, 2018.

* cited by examiner

SYSTEMS AND METHODS FOR GENERATING AND CONFIGURING CONTENT OF ELEVATOR DESTINATION DISPATCH KIOSKS

FIELD OF THE DISCLOSURE

The disclosure relates generally to the field of elevator destination dispatch kiosks. More specifically, the disclosure relates to automating the generation and configuration of content of elevator destination dispatch kiosks.

SUMMARY

The following presents a simplified summary of the disclosure in order to provide a basic understanding of some aspects of the disclosure. This summary is not an extensive overview of the disclosure. It is not intended to identify critical elements of the disclosure or to delineate the scope of the disclosure. Its sole purpose is to present some concepts of the disclosure in a simplified form as a prelude to the more detailed description that is presented elsewhere.

According to an embodiment, a computer-implemented method for generating and configuring content of an elevator destination dispatch kiosk includes the step of creating a kiosk database. The elevator destination dispatch kiosk comprises a display having a primary display area, a secondary display area, and an auxiliary display area. The primary display area includes an instruction portion and a floor button portion. The kiosk database includes kiosk data which outlines: (a) a width and a height of the primary display area; and (b) a plurality of destination floors associated with the elevator destination dispatch kiosk. The method includes the step of using a computing structure remote from the elevator destination dispatch kiosk to automatically: (i) access the kiosk data in the kiosk database; (ii) calculate a height of the floor button portion using the height of the primary display area; and (iii) generate a floor button layout. The method comprises the step of communicating the floor button layout from the computing structure to the elevator destination dispatch kiosk to cause the floor button layout to be published on the display. An interface of the computing structure allows the floor button layout to be previewed before the floor button layout is communicated from the computing structure to the elevator destination dispatch kiosk.

According to another embodiment, a non-transitory computer readable medium has computer executable instructions stored thereon. The instructions are executed by a digital processor to perform the method of generating and configuring content of an elevator destination dispatch kiosk. The medium includes instructions for retrieving a plurality of destination floors associated with the elevator destination dispatch kiosk. The medium has instructions for calculating a height of a floor button portion of a display of the elevator destination dispatch kiosk, and instructions for automatically generating a floor button layout based on a set of rules. The medium comprises instructions for allowing the floor button layout to be previewed before the floor button layout is communicated to the elevator destination dispatch kiosk. The medium further includes instructions for communicating the floor button layout to the elevator destination dispatch kiosk to cause the floor button layout to be published on the display.

According to yet another embodiment, a computer-implemented method for generating and configuring content of an elevator destination dispatch kiosk includes the step of creating a kiosk database including kiosk data. The elevator destination dispatch kiosk includes a display. The kiosk data outlines a plurality of destination floors associated with the elevator destination dispatch kiosk. The method includes the step of using a computing structure remote from the elevator destination dispatch kiosk to automatically: (a) access the kiosk data in the kiosk database, and (b) generate a floor button layout. The method comprises the step of communicating the floor button layout from the computing structure to the elevator destination dispatch kiosk to cause the floor button layout to be published on the display. An interface of the computing structure allows the floor button layout to be previewed before the floor button layout is communicated from the computing structure to the elevator destination dispatch kiosk.

BRIEF DESCRIPTION OF THE SEVERAL VIEWS OF THE DRAWINGS

Illustrative embodiments of the present disclosure are described in detail below with reference to the attached drawing figures and wherein.

DETAILED DESCRIPTION

Figure 1:
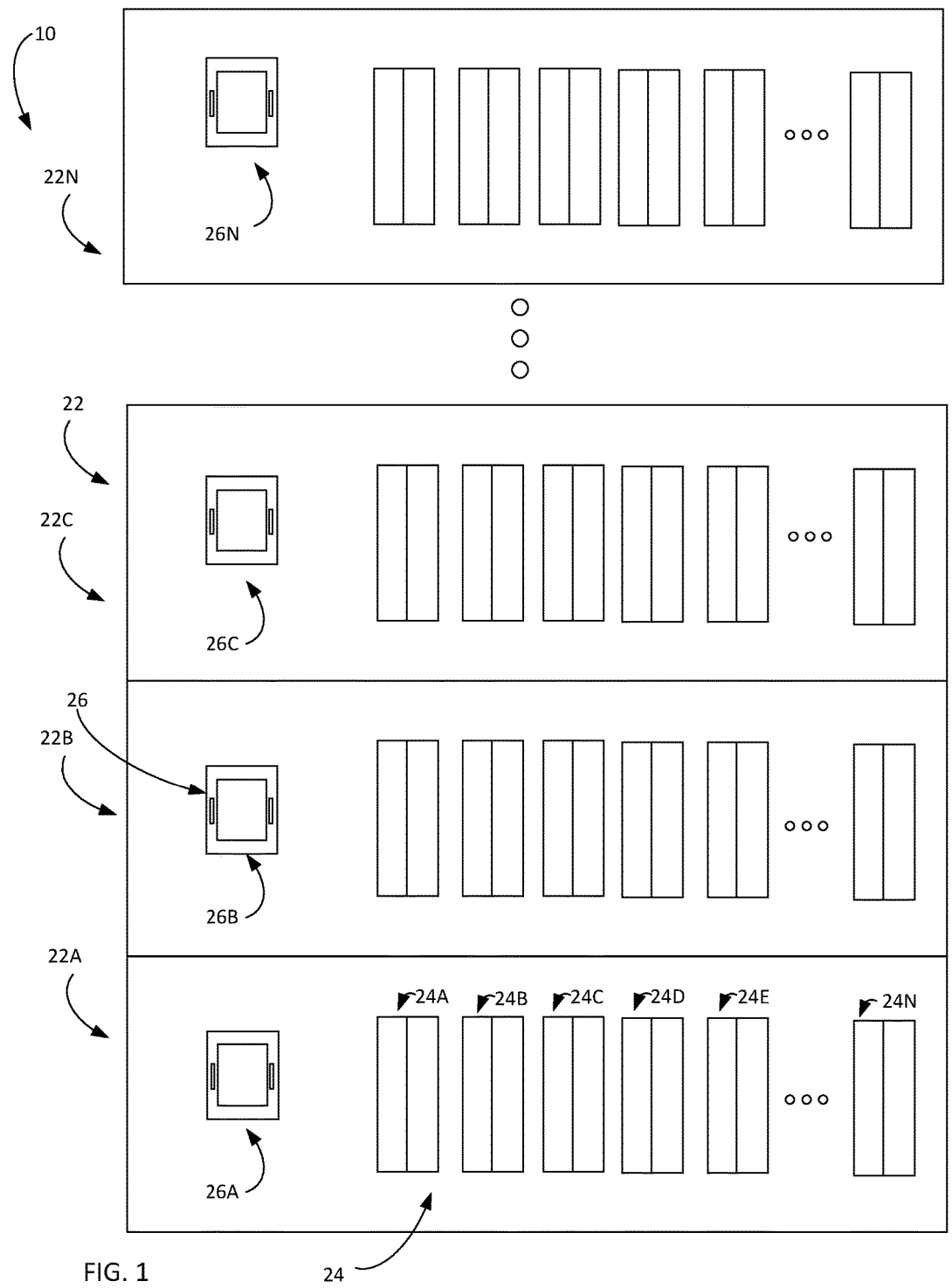
FIG. 1 is a schematic representation of a building having a plurality of elevator destination dispatch kiosks.

Elevators, which were once installed in a select few buildings, have now become ubiquitous. According to the National Elevator Industry, Inc., there are about a million elevators in the United States alone, which are collectively used about eighteen billion times a year to transport one or more passengers from one floor to another. Each elevator may include an elevator interface, which is typically provided inside the elevator (e.g., adjacent the door thereof). A passenger may enter an elevator and employ the interface to select his or her destination floor. An elevator controller in data communication with the elevator interface may subsequently cause the elevator to travel to the floor selected by the passenger.

Some buildings may include an elevator bank comprising two or more elevators. When a passenger calls an elevator, e.g., to the lobby of a building, the closest elevator may be assigned to the call. Once the elevator reaches the lobby, all the passengers waiting for an elevator in the lobby may attempt to board the elevator, until, e.g., the elevator is full. Such may be operationally inefficient. Some of the passengers aboard the elevator may be headed to lower floors, whereas other passengers aboard the elevator may be headed to higher floors. The elevator may consequently make many stops, which may needlessly increase the average time it takes for a passenger to reach his or her desired floor.

Elevator destination dispatch systems (e.g., kiosks) have recently been introduced to address this problem. The destination dispatch kiosks are conventionally located outside the elevator to allow each passenger to indicate his or her destination floor (or other location) before boarding an elevator. Each destination dispatch kiosk may include or have associated therewith a processor and a memory housing algorithms directed generally to minimizing the average time it takes for passengers to reach their respective destination floors via the elevators. For example, as is known, the kiosk may facilitate grouping of elevators' passengers based on their destination floors.

Each destination dispatch kiosk may include input device(s) (e.g., input keys, buttons, switches, gesture recognition devices, infrared readers, etc.) and output devices(s) (e.g., a display, a speaker, a warning light, etc.). The functionality of at least some of the input and output devices may be combined (e.g., as a touchscreen display). The kiosk display may show, among other content, a plurality of floor buttons, each of which may be associated with a particular destination floor. A passenger wishing to board an elevator may interact with (e.g., press, virtually activate, etc.) a floor button on the destination dispatch kiosk display to indicate his or her desired destination floor, and the kiosk may use this input to call an elevator for the passenger. The kiosk may then employ the input to identify the particular elevator (which may be the next elevator to arrive at the passenger's floor or a different elevator) the passenger should take to reach his or her destination floor. The artisan will understand that the kiosk display need not be a touchscreen or traditional display, but may instead simply be an area of the kiosk on which content is presented; for example, the kiosk may include optical or other sensors, which may allow a passenger to select a floor button presented (e.g., projected or otherwise shown) on the kiosk display without contacting the kiosk display.

The content (e.g., the floor buttons) displayed on an output (such as a display as discussed above) of a destination dispatch kiosk located at one floor of a building may be different from the content displayed on an output of a destination dispatch kiosk located in another area on the same floor and/or from the content displayed on an output of a dictation dispatch kiosk located at another floor of that building and/or from the content displayed on an output of a destination dispatch kiosk located in another building. Current methods to generate and configure content (e.g., generate the floor buttons and arrange them in a particular pattern on the touchscreen or other display) for destination dispatch kiosks are generally time consuming and laborious. In many cases, an engineer or other person with significant technical expertise must be retained to program the floor buttons, their respective sizes, and the position of each floor button on the display. It may be desirable to have in place a system that allows for the content of a destination dispatch kiosk to be more readily created and configured. The present disclosure relates, in general, to a system that may automate, in whole or in part, the generation and configuration of content displayed on destination dispatch kiosks. More specifically, in embodiments, the system may automatically generate floor buttons for the kiosk display and configure the layout thereof.

Attention is directed now to FIG. 1, which shows an example multi-story building 10 having floors 22 (e.g., floors 22A-22N) and elevators 24 (e.g., elevators 24A-24N). Each floor 22 may include a separate destination dispatch kiosk 26 (e.g., one of destination dispatch kiosks 26A-26N) that is located outside the elevator doors to allow a passenger to indicate his or her destination floor prior to boarding an elevator. While FIG. 1 shows that each floor 22 has one destination dispatch kiosk 26 associated therewith, the artisan will understand that certain floors 22 may not include any destination dispatch kiosks 26 and that other floors 22 (e.g., the building lobby) may include two or more destination dispatch kiosks 26.

Figure 2:
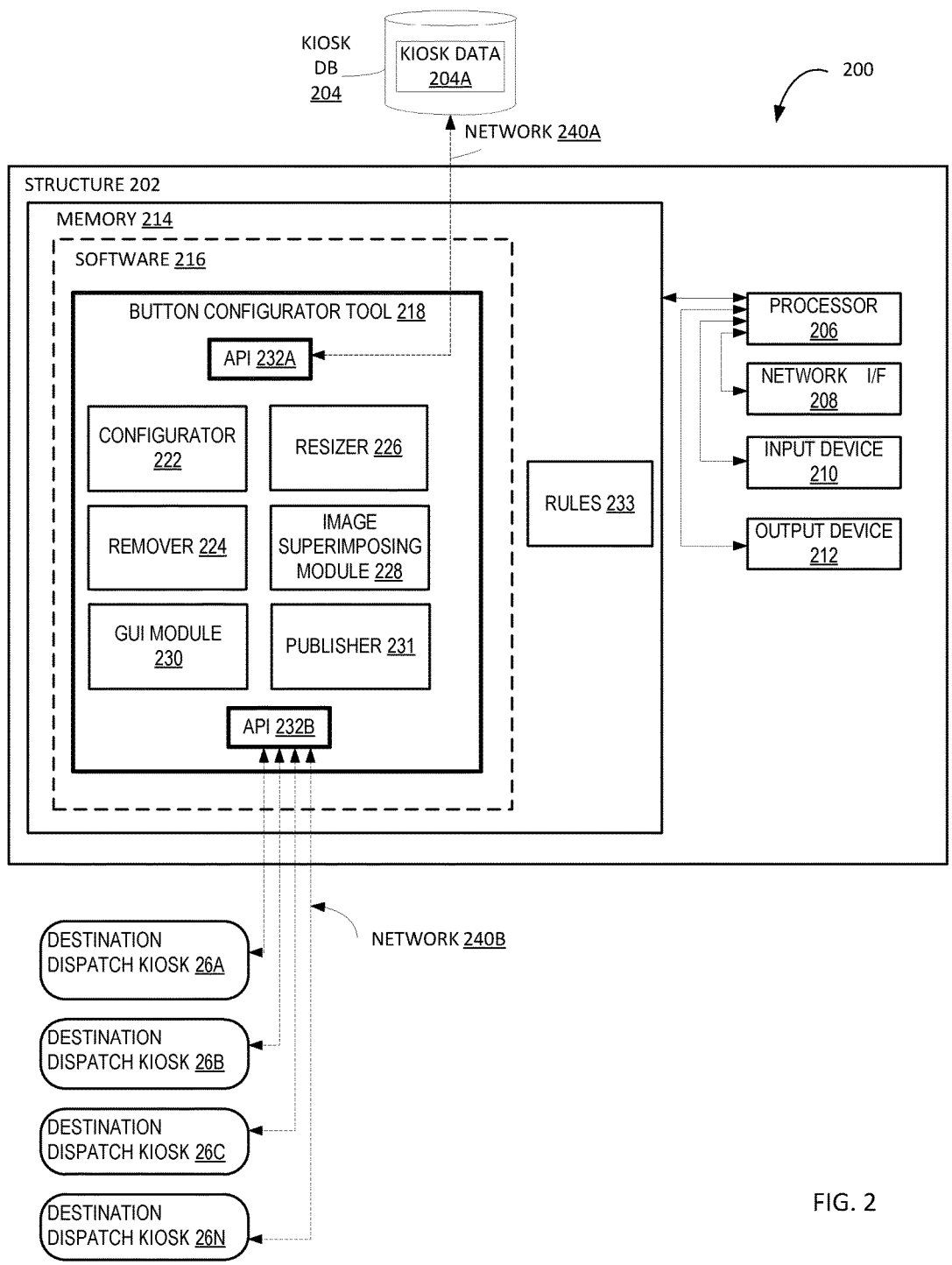
FIG. 2 is a schematic illustrating a system having a button configurator tool for generating and configuring floor buttons of the destination dispatch kiosks of FIG. 1, according to an embodiment.

FIG. 2 shows a system 200 for generating and configuring floor buttons of a destination dispatch kiosk, such as the destination dispatch kiosk 26, according to an example embodiment. The system 200 may include a structure 202, a destination dispatch kiosk 26 (e.g., kiosks 26A, 26B, 26C, and/or 26N), and a kiosk database 204.

The structure 202 may be a computing device, such as a desktop computer, a laptop computer, a smart phone, a tablet, a web or other server, etc. In embodiments, the structure 202 may be a dedicated computing device adapted to generate and configure content for the destination dispatch kiosk 26 in line with the teachings of the present disclosure.

The structure 202 may include a processor 206, which may be in data communication with a network interface 208, an input device 210, an output device 212, and a memory 214. The processor 206 represents one or more digital processors. Network interface 208 may be implemented as one or both of a wired network interface and a wireless network interface, as is known in the art. The input device 210 may include a keyboard, a mouse, a stylus pen, buttons, knobs, switches, gesture recognition and/or any other device that may allow a user to provide an input to the system 200 via the structure 202. In some embodiments, the input device 210 may comprise a media port (such as a USB port or a SD or microSD port) to allow for media (e.g., a USB drive, a SD or micro SD drive, a laptop memory, a smart phone memory, etc.) to be communicatively coupled to the structure 202. The output device 212 may include one or more visual indicators (e.g., a display), audible indicators (e.g., speakers), or any other such output device now known or subsequently developed. In some embodiments, at least a part of the input device 210 and the output device 212 may be combined. A user may functionally interact with the system 200, including the kiosk 26 thereof, using the input device 210 and the output device 212.

Memory 214 represents one or more of volatile memory (e.g., RAM) and non-volatile memory (e.g., ROM, FLASH, magnetic media, optical media, etc.). Although shown within the structure 202, memory 214 may be, at least in part, implemented as network storage that is external to the structure 202 and accessed via the network interface 208. The memory 214 may house software 216, which may be stored in a transitory or non-transitory portion of the memory 214. Software 216 includes machine readable instructions that are executed by processor 206 to perform the functionality described herein. In some example embodiments, the processor 206 may be configured through particularly configured hardware, such as an application specific integrated circuit (ASIC), field-programmable gate array (FPGA), etc., and/or through execution of software (e.g., software 216) to perform functions in accordance with the disclosure herein.

The software 216 may include a button configurator tool 218. The button configurator tool 218 may, in embodiments, be an "application", such as a mobile application configured for an Android, Apple, or other device, a computer application configured for a desktop or mobile computer, etc. Alternately or additionally, in some embodiments, the button configurator tool 218 may be accessible over a network (e.g., over the internet via a password protected or other website, over an intranet, etc.). The button configurator tool 218 may include one or more of a configurator 222, a remover 224, a resizer 226, an image superimposing module 228, a graphical user interface module 230, a publisher 231, and Application Programming Interfaces ("API") 232A and 232B, each of which are described in more detail herein. In embodiments, rules 233, which may be stored in the memory 214 or in another memory accessible to the button configurator tool 218, may govern the operation of the button configurator tool 218.

The structure 202, via the API 232A, may selectively communicate over a network 240A with the kiosk database 204. The structure 202, via the API 232B, may likewise communicate over a network 240B with the destination dispatch kiosks 26A-26N. Each of the networks 240A and 240B may be wired or wireless, and in embodiments, may be the same network. As discussed herein, the button configurator tool 218 may generate floor buttons for each of the destination dispatch kiosks 26A-26N, and automatically configure the layout thereof. The artisan will readily appreciate that the floor buttons and floor button layout of one destination dispatch kiosk 26 (e.g., destination dispatch kiosk 26A) may be different from the floor buttons and/or the floor button layout (i.e., "pattern") of another destination dispatch kiosk 26 (e.g., destination dispatch kiosk 26B).

Figure 3:
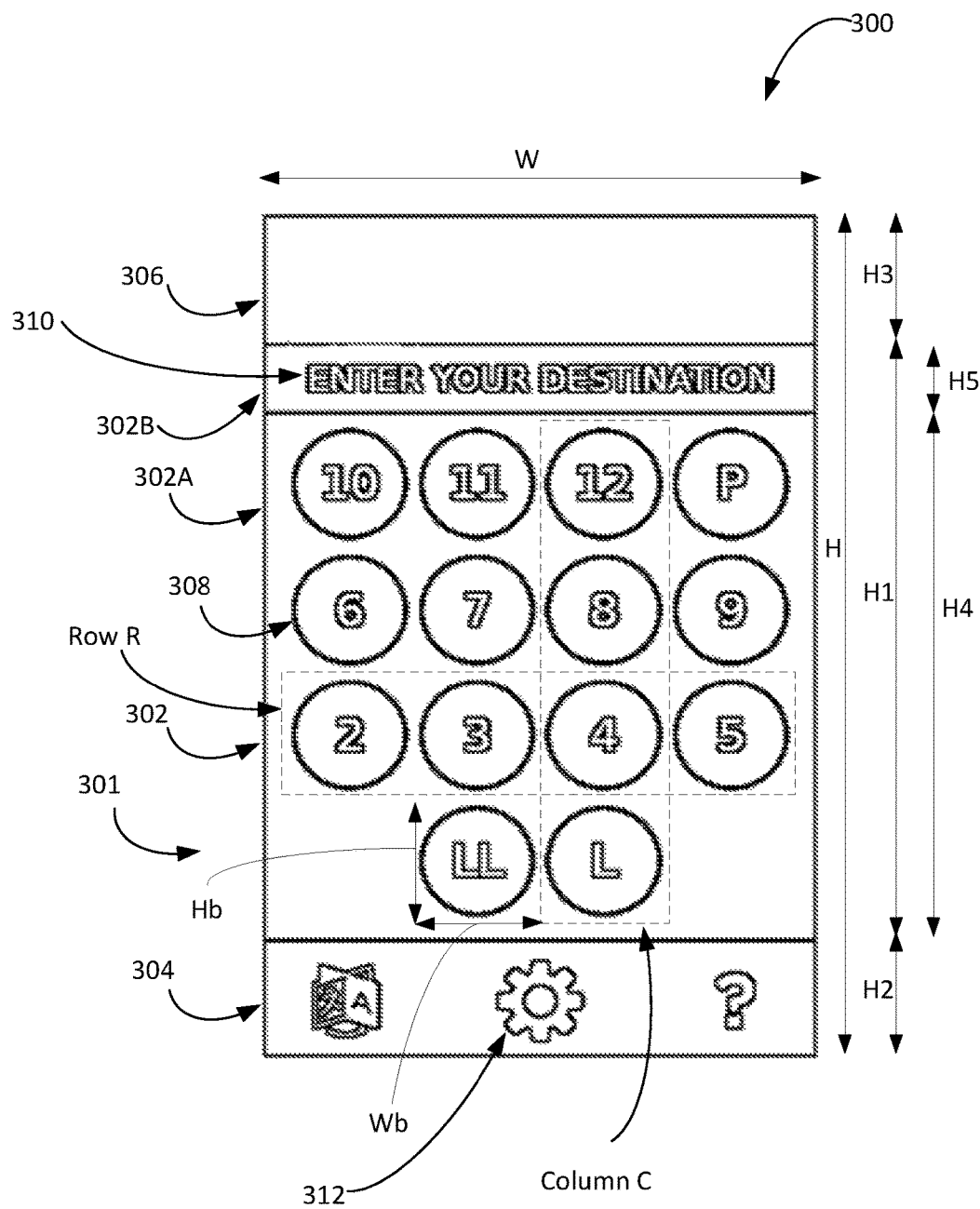
FIG. 3 is a front view of a display of one destination dispatch kiosk of FIG. 1.

FIG. 3 shows an example display 300 of a destination dispatch kiosk 26 (e.g., of the destination dispatch kiosk 26C). The display 300 in FIG. 3 is shown displaying an example home screen (or home page or start page) 301 of the kiosk user interface, which a passenger may employ to, among other things, indicate his or her desired destination floor. The artisan will understand that the home screen 301 of one destination dispatch kiosk (e.g., kiosk 26A) may differ from the home screen of another destination dispatch kiosk (e.g., kiosk 26B).

The display 300 may have a primary (or first) display area 302, a secondary (or second) display area 304, and an auxiliary (or third) display area 306. The display areas 302, 304, 306 may, in embodiments, be associated specifically with the home screen 301 (e.g., in embodiments, a different page of the kiosk interface may have different display areas associated therewith). While the display 300 displaying the home screen 301 in FIG. 3 includes three display areas, the artisan will appreciate that such is merely exemplary and is not intended to be independently limiting.

The primary display area 302 of the display 300 may have a height H1 and a width W. In an embodiment, the primary display area 302 may include a floor button portion 302A and an instruction portion 302B. The floor button portion 302A may be configured to display destination floor buttons 308 (e.g., the buttons LL, L, 2-12, and P shown in FIG. 3) on the primary display area 302 of the display 300. The instruction portion 302B of the primary display area 302 may be configured to display an instruction (or message) 310 for an elevator passenger. For example, the instruction "ENTER YOUR DESTINATION", or another instruction 310, may be displayed on the instruction portion 302B when the home page 301 of the kiosk interface is displayed on the display 300.

The secondary display area 304 may, in embodiments, be downwardly adjacent the primary display area 302, and may be configured to display "icons" (e.g., buttons other than the floor buttons 308), such as a settings icon, a language icon, a help icon, etc. The auxiliary display area 306 may (but need not) be configured to display content (e.g., an image of the building 10, an advertisement, etc.). The artisan will appreciate from the disclosure herein that various types of content may be displayed on each of the primary display area 302, the secondary display area 304, and the auxiliary display area 306 of the kiosk display 300.

In an example embodiment, the kiosk display 300 may have a width W and a height H; each of the primary display area 302, the secondary display area 304, and the auxiliary display area 306 may have the same width W, whereas the height of each of the primary display area 302, the secondary display area 304, and the auxiliary display area 306 may be less than the height H. For instance, and as illustrated in FIG. 3, the height of the primary display area 302, the secondary display area 304, and the auxiliary display area 306 may be H1, H2, and H3, respectively.

The kiosk database 204 (FIG. 2) may include kiosk data 204A to allow the button configurator tool 218 to automatically generate and configure (i.e., arrange in a particular pattern) the floor buttons (e.g., floor buttons 308) for each kiosk 26. For example, with respect to each kiosk 26, the kiosk data 204A in the kiosk database 204 may include: (a) a field comprising the destination floors associated with the particular kiosk 26 (i.e., the destination floors a passenger may select using that kiosk 26); and (b) a field outlining the dimensions of at least the primary area 302 of the display 300 of that kiosk 26. For example, with respect to the kiosk 26 whose display 300 is shown in FIG. 3, the kiosk data 204A in the database 204 may provide: (a) the destination floors are LL, L, 2-12, and P; and (b) the width and height of the primary area 302 is W and H1, respectively. In embodiments, the database 204 may also include the overall dimensions of the display 300, and the dimensions of the secondary display area 304 and the auxiliary display area 306. Further, in some embodiments, information in the database 204 regarding the dimensions of the display 300, including of the primary display area 302 thereof, may be indexed to a stock keeping unit (SKU) or other such unique identification number associated with kiosks 26 of the same type; such may save space in the database 204 and reduce processing times by obviating the need to repeatedly provide in the database 204 the dimensions of the display and display areas of each kiosk.

Figure 4:
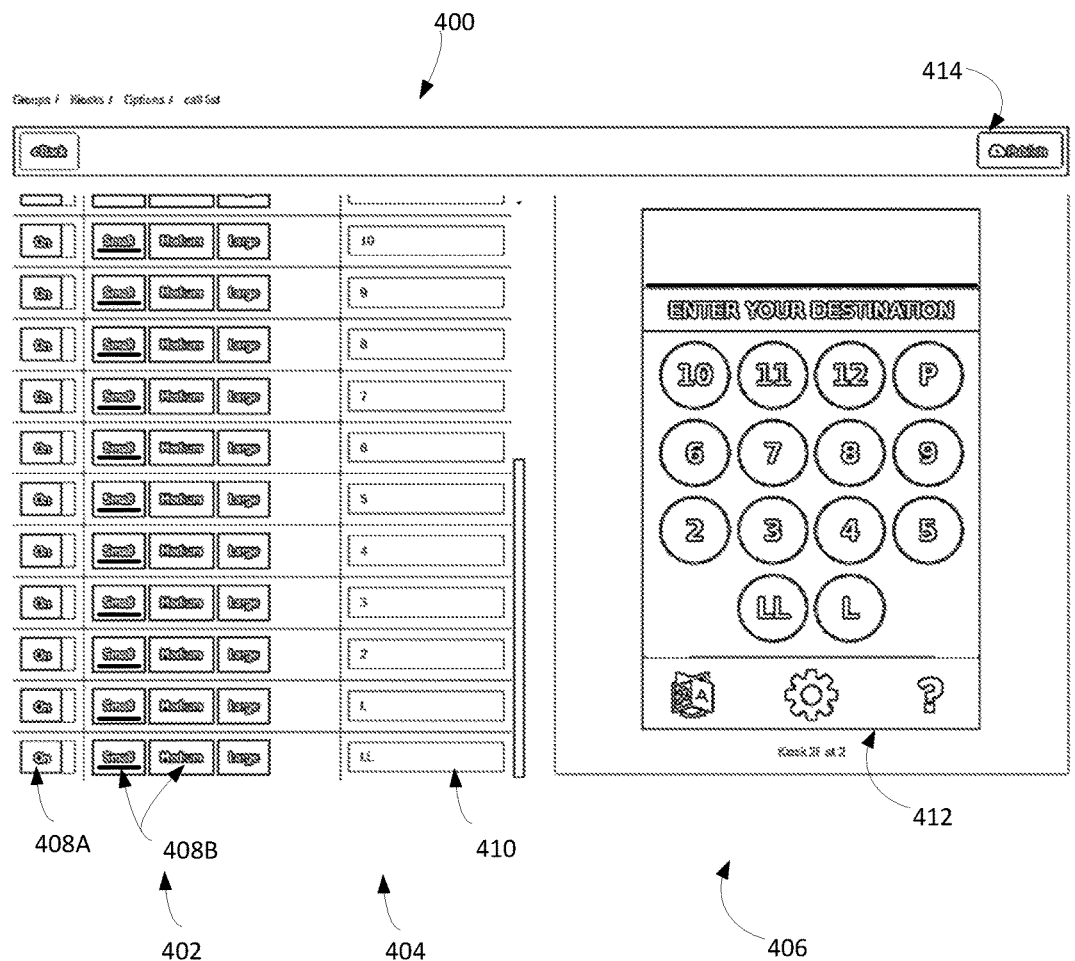
FIG. 4 is a schematic illustrating an interface of the button configurator tool of FIG. 2.

FIG. 4 shows an example graphical user interface 400 of the button configurator tool 218 generated by the GUI module 230 (FIG. 2), according to an example embodiment. A user (e.g., an elevator operator, an owner, landlord, or tenant of the building in which the kiosk 26 is located, etc.) may interact with the button configurator tool 218 via the interface 400 and the input and output devices 210, 212, respectively. The button configurator tool 218 may in-turn generate and configure floor buttons for the home screen 301 of the kiosk interface.

The graphical user interface 400 of the button configurator tool 218 may include a control area 402, a destination floor area 404, and a kiosk display area 406. The control area 402 may include various input keys, such as enable/disable keys 408A and sizing keys 408B. The destination floor area 404 may include a plurality of text boxes 410, each of which may list a floor label (i.e., the text for a floor button 308). As discussed herein, the user may use the input keys 408A, 408B and the text boxes 410 to customize the home screen 301 of the kiosk 26. For example, as described below, the user may use the enable/disable keys 408A to toggle a certain destination floor button (e.g., floor button "LL") on and off and/or use the sizing keys 408B to change a size of a particular destination floor button 308 appearing on the kiosk display 300. The kiosk display area 406 of the button configurator tool's graphical user interface 400 may present a virtual display 412 simulating the kiosk display 300, to indicate how the selected content will appear on the kiosk display 300 once it is communicated to the kiosk 26 by the button configurator tool 218.

Figure 5:
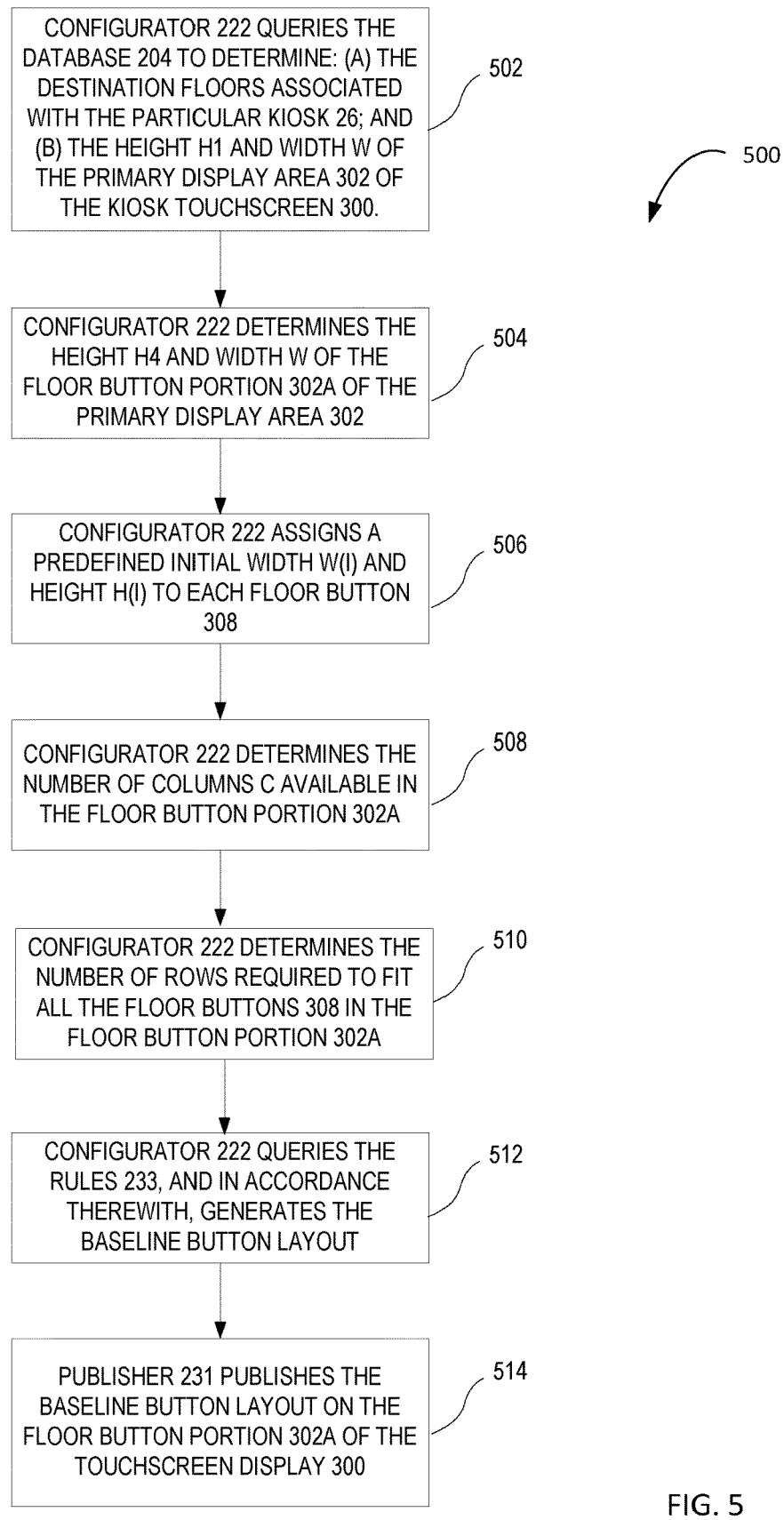
FIG. 5 is a flowchart illustrating a method of using the button configurator tool of FIG. 2 to generate a baseline button arrangement for a destination dispatch kiosk.

Attention is directed now to FIG. 5, which shows a method 500 of using the configurator 222 (FIG. 2) to automatically generate a baseline button arrangement for the kiosk display 300. For purposes of illustration, assume that the configurator 222 of the button configurator tool 218 is being used to automatically generate and configure the floor buttons 308 for the kiosk display 300 shown in FIG. 3.

At step 502, once the button configurator tool 218 has been accessed (as discussed herein), the configurator 222 may query the kiosk database 204 to determine: (a) the destination floors associated with the particular kiosk 26; and (b) the dimensions of the primary display area 302 of the display 300 of that kiosk 26. For example, with respect to kiosk 26 whose display is shown in FIG. 3, the configurator 222 may query the database 204 and determine at step 502 that: (a) the floors associated with the kiosk 26 are LL, L, 2-12, and P; and (b) the height and width of the primary display area 302 is H1×W, respectively. As noted above, in some embodiments, information in the database 204 regarding the dimensions of the primary display area 302 of the kiosks may be grouped together based on the SKU (or other identification number) of the kiosks; in these embodiments, the configurator 222 may determine the SKU of the kiosk 26, and then determine the height and width of the primary display area 302 thereof by ascertaining the primary display area dimensions in the database 204 associated with that SKU.

At step 504, the configurator 222 may determine the height and width of the floor button portion 302A (i.e., height H4 and width W) of the primary display area 302. That is, the configurator 222 may determine the dimensions of that area of the kiosk display 300 on which the destination floor buttons 308 are to be displayed. Because the width W of the primary display area 302 may be stored in the database 204 and may be the same as the width W of the floor button portion 302A, the configurator 222 assign the width W obtained at step 502 to the floor button portion 302A at step 504. The configurator 222 may calculate the height H4 of the floor button portion 302A by determining the height H5 of the instruction portion 302B and subtracting this height H5 from the height H1 of the primary display area 302 obtained at step 502 (i.e., H1 (as stored)−H5 (as determined)=H4). In an embodiment, the configurator 222 may determine the height H5 of the instruction portion 302B by calculating a height of the text comprising the message 310 to be displayed in the instruction portion 302B. For instance, in this example, the configurator 222 may use the font size (or other means) to determine the height of the instruction message "ENTER YOUR DESTINATION", and thereby, determine the height H5 of that portion of the primary display area 302 that is configured to display the instruction message 310. The height of the remainder of the primary display area 302 (i.e., height H4) may be assigned to the floor button portion 302A at step 504.

Once the dimensions of the floor button portion 302A (i.e., height H4, width W) are determined at step 504, at step 506, the configurator 222 may assign a predefined initial size (i.e., a predefined width W(I) and a predefined height H(I)) to each floor button 308. The predefined initial width W(I) may be the same as the predefined initial height H(I) (i.e., the aspect ratio of the floor buttons 308 in the baseline button arrangement may be 1:1). The predefined initial width W(I) may be, for example, 0.5 inches, or a different width.

At step 508, the configurator 222 may determine the number of columns C (see FIG. 3) available in the floor button portion 302A of the primary display area 302. In an embodiment, the number of columns C is determined by the following formula:

$$\text{floor}(C) = \left\lfloor \frac{W(I)}{W(II)} \right\rfloor,$$

where W(II)=attempted button width. The value of W(II) must be chosen so that the padding between floor numbers is at least 0.05% of W(I). In some embodiments, the maximum number of columns may be capped at a maximum threshold value, for example $C \leq 6$.

At step 510, the configurator 222 may determine the number of rows R (see FIG. 3) that are required to fit all the floor buttons 308 in the floor button portion 302A. For instance, the configurator 222 may, based on the size of each button 308, the size of the floor button portion 302A, and the number of columns C, determine that four (or a different number) of rows R would be needed to fit each of the fourteen button 308 in the floor button portion 302A.

Once the grid size has been calculated, at step 512, the configurator 222 may query the rules 233, and in accordance therewith, generate the baseline button arrangement for the display 300. As noted, the baseline button arrangement of the floor buttons 308 may appear as shown in FIG. 3. For example, as shown, the baseline button layout (or pattern) may include four columns C, four rows R, the height and width of each button may be Hb and Wb, respectively, et cetera. The selected button arrangement (i.e., the baseline button arrangement in this example) may be displayed on the virtual display 412 (FIG. 4) of the interface 400 to give the user a preview of the selected layout.

The rules 233 may allow the configurator 222 to generate an optimal button layout for the floor button portion 302A. In an example embodiment, the rules 233 may provide that: (a) the size of each floor button 308 displayed on the floor button portion 302A is to be maximized; (b) the aspect ratio of each floor button 308, unless otherwise indicated by the user as discussed below, is 1:1; (c) each of the top, bottom, and sides of the floor button portion 302A must include padding (i.e., areas devoid of floor buttons 308 or other content) that is equal to five (or a different) percentage of the total width W of the floor button portion 302A; (d) the buttons 308 are sequentially laid out in the floor button portion 302A in rows and in descending order, starting with the highest building floor at the top right of the grid (i.e., the Penthouse button "P" is situated first in the top right corner of the top row, then the button "12" is situated to its left, and so on); (e) all the floor buttons 308 are aligned the same way (e.g., are centered); and (f) each floor button 308 associated with the particular kiosk display 300 fits within the floor button portion 302A. The artisan will appreciate that the rules 233 expressly outlined herein are exemplary only and are not intended to be independently limiting. Based on these rules, the configurator 222 may generate the floor buttons LL, L, 2-12, and P, and indicate the arrangement thereof on the virtual display 412 as shown in FIG. 4.

At step 514, the configurator 222 may call the publisher 231, which may automatically publish the baseline button layout on the floor button portion 302A of the display 300 (e.g., over the wired or wireless network 240B). In this way, thus, a user may employ the button configurator tool 218 to automatically generate and configure the floor buttons 308 for the kiosk display 300 (e.g., from a location remote from the kiosk display 300). In some embodiments, a user may be able to manually call the publisher 231 (e.g., by interacting with a publishing key 414 (FIG. 4) on the graphical user interface 400 of the button configurator tool 218) to cause the content generated and configured by the tool 218 to be pushed onto the particular kiosk 26.

From time to time, the user may wish to modify the baseline button arrangement shown in FIG. 3. For example, a user may wish to modify the baseline button arrangement by increasing or decreasing the size of one or more floor buttons 308. The interface 400 of the button configurator tool 218, together with the resizer 226, may allow for such.

Figure 6:
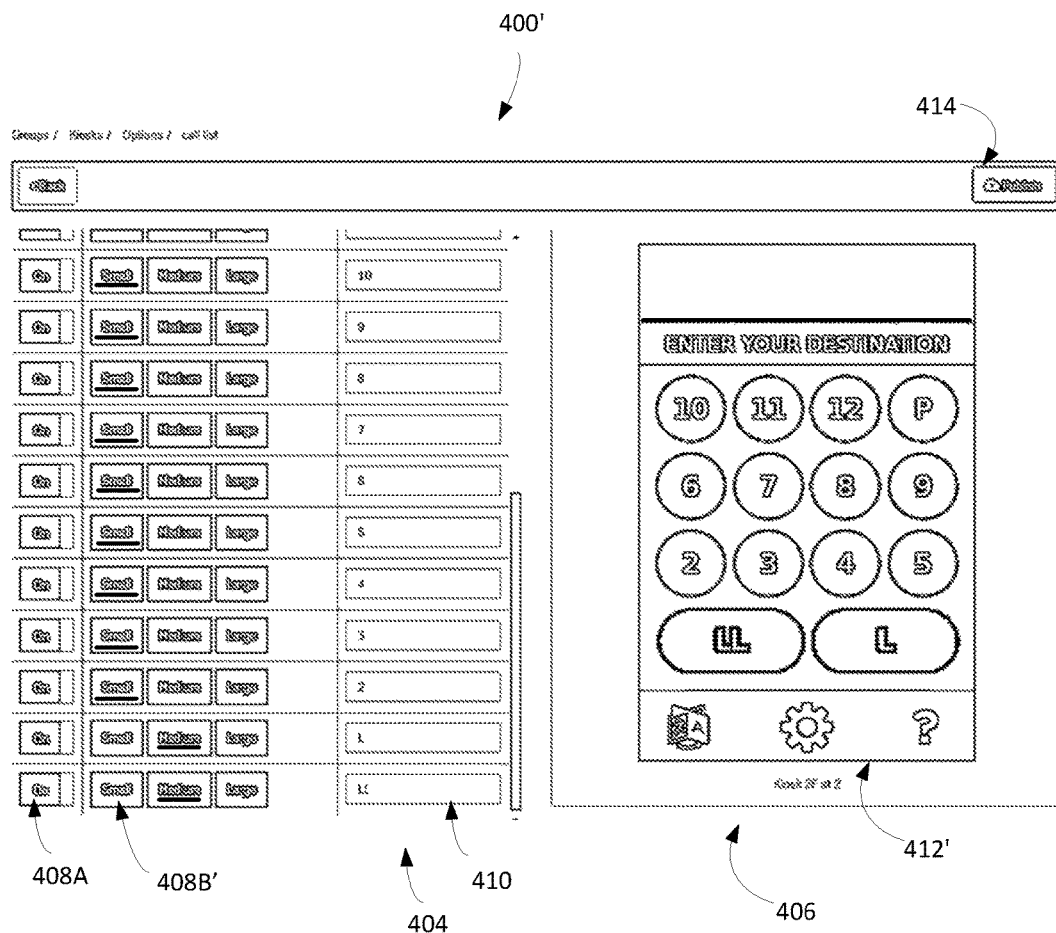
FIG. 6 is a schematic illustrating the interface of the button configurator tool of FIG. 2 being used to resize floor buttons appearing on the destination dispatch kiosk.

FIG. 6 shows the button configurator tool interface 400', which is generally identical to the interface 400 in FIG. 4, except as specifically noted and/or shown, or would be inherent. The main difference between the interface 400 and the interface 400' is that the interface 400', and specifically the sizing keys 408B' thereof (i.e., the sizing keys 408B' associated with the floors "L" and "LL"), have been used by the user to increase the size of certain floor buttons 308 (i.e., floor buttons "LL", and "L" in this example). As can be seen, the virtual display 412' of the interface 400' allows the user to preview the selected button arrangement as it would appear on the display 300.

Figure 7:
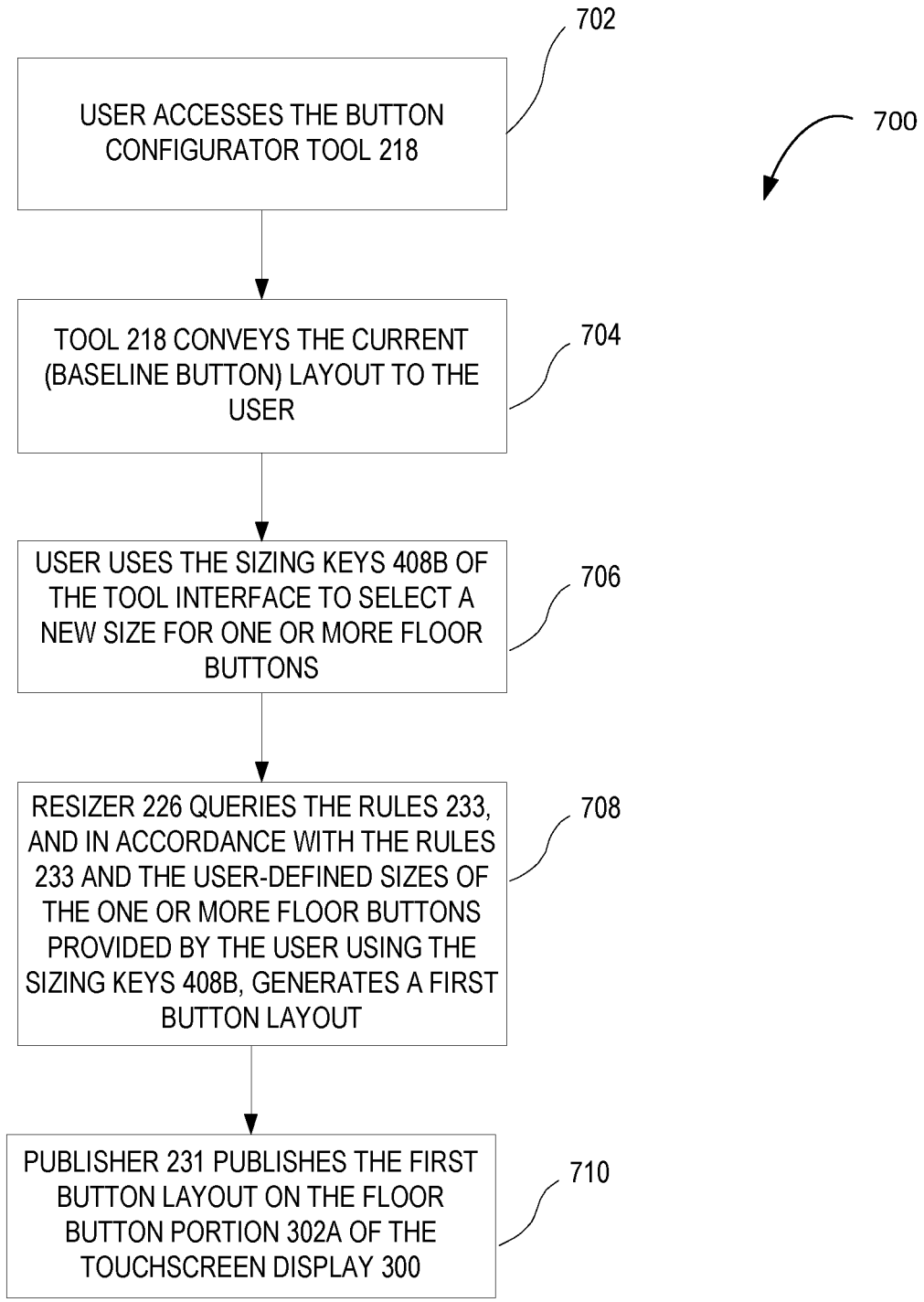
FIG. 7 is a flowchart illustrating a method of using the button configurator tool of FIG. 2 to resize floor buttons appearing on the destination dispatch kiosk.

FIG. 7 shows a method 700 of using the button configurator tool 218, e.g., the resizer 226 thereof, to change the size of one or more of the floor buttons 308 appearing on the floor button portion 302A. At step 702, the user accesses the button configurator tool 218 (e.g., via a web page, a mobile or computer application, etc.). At step 704, the button configurator tool 218 may convey the current floor button layout to the user. For example, the GUI module 230 may cause to be displayed on the output device 212 the interface 400 (FIG. 4), which shows, among other things, the auto-populated text boxes 410 including the floor labels, the sizing buttons 408B, the current size of each floor button, the virtual display 412 simulating a kiosk display 300 having the current (e.g., the baseline button) layout, etc.

At step 706, the user may use the sizing keys 408B of the tool interface to select a new size for one or more floor buttons. For example, as shown in FIG. 6, the user may use the sizing key 408B associated with each of the floor buttons "L" and "LL" to change the size of these floor buttons from "small" to "medium." Changing the size of a floor button by using the sizing key 408B may, in embodiments, change the aspect ratio of the floor button (e.g., changing the size of a floor button 308 from small to medium may change its height to width ratio from 1:1 to 1:2). Alternately, in some embodiments, changing the size of a floor button 308 by using the sizing keys 408B may change the size of the floor button without changing the aspect ratio. While three sizes (i.e., "small", "medium", and "large") are shown in the figures, the artisan will appreciate that the sizing keys 408B may likewise allow the user to select other sizes (e.g., "extra-large", "extra-small", etc.).

Once the user modifies the size of one or more of the floor buttons using the sizing keys 408B, the resizer 226 may query the rules 233 and, taking into account the user inputs and the rules 233, generate a first button layout at step 708. As can be seen, the first button layout (a preview of which is shown in the virtual display 412' in FIG. 6) may be different from the baseline button layout (shown in FIG. 3).

Generation of the first button layout by the resizer 226 may be similar to the generation of the baseline button layout by the configurator 222 as discussed above, except that the resizer 226 may additionally take the user-defined sizes of the one or more floor buttons into account. For instance, in the illustrated examples, while the configurator 222 may determine the number of columns and rows of the baseline button layout based on the assumption that each of the fourteen spots (i.e., one spot for each floor button) in the grid is of the same size, the resizer 226 may take into account that twelve of the fourteen spots (i.e., the spots for the floor buttons 2-12 and P) are of the same size while two of the fourteen spots (i.e., the spots for the floor buttons L and LL) have a larger size. Of course, while FIG. 6 shows that the size of certain floor buttons 308 appearing on the floor button portion 302A of the display 300 is being increased, the button configurator tool 218 may likewise be used to decrease the size of one or more floor buttons 308.

At step 710, once the first button layout has been created and previewed by the user via the virtual display 412', the resizer 226 may automatically call the publisher 231 (or the user may interact with the publishing key 414 (FIG. 6)) to cause the content generated and configured by the tool 218 to be pushed onto the particular kiosk 26. The user may thus use the button configurator tool 218 to quickly and conveniently customize the button layout of the destination dispatch kiosk 26.

It may also be desirable to allow the user to modify the baseline button arrangement (FIG. 3) in other ways. For instance, a user may wish to disable certain floor buttons 308 of a particular kiosk 26. The remover 224 of the tool 218 may allow a user to disable one or more floor buttons.

Figure 8:
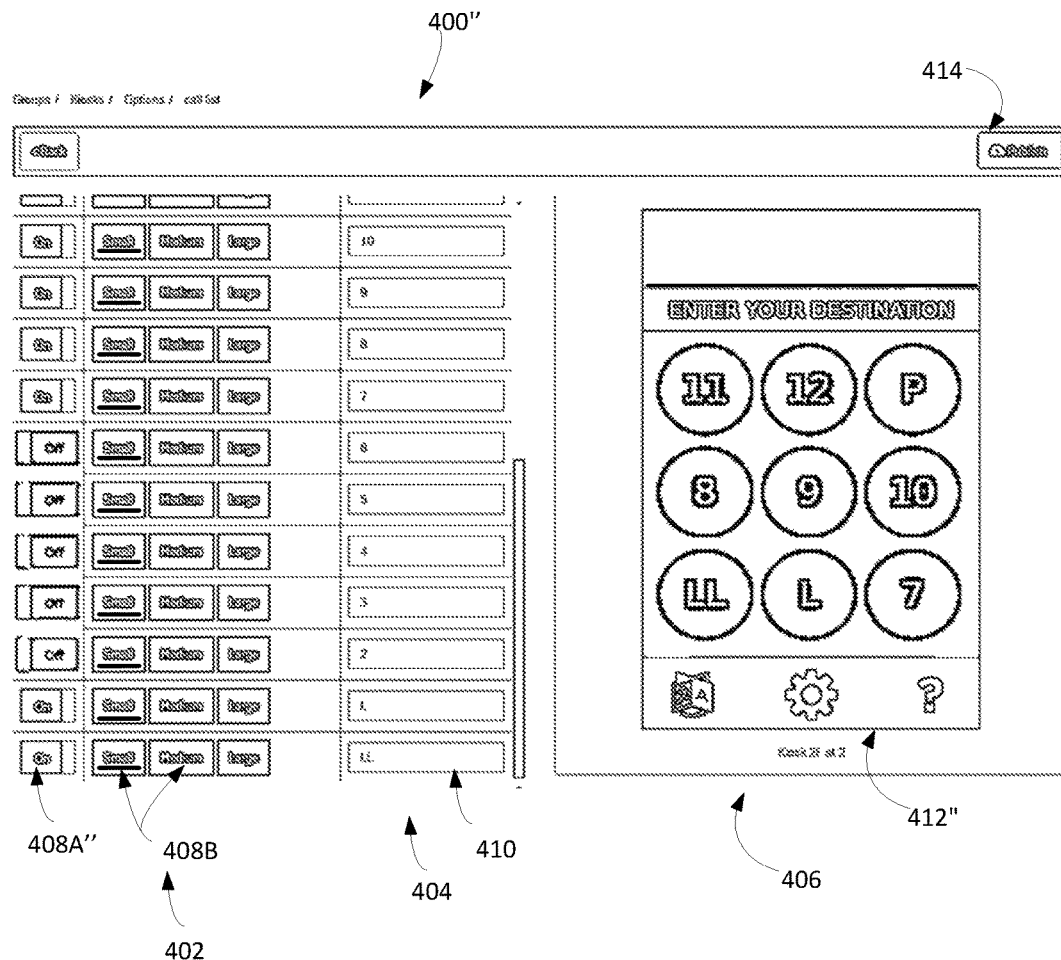
FIG. 8 is a schematic illustrating the interface of the button configurator tool of FIG. 2 being used to disable floor buttons on the destination dispatch kiosk.

FIG. 8 shows the button configurator tool interface 400", which is generally identical to the interface 400 in FIG. 4, except as specifically noted and/or shown, or would be inherent. The main difference between the interface 400 and the interface 400" is that the interface 400", and specifically certain enable/disable keys 408A" thereof (i.e., the enable/disable keys 408A associated with the floor buttons 2-6), have been used by the user to disable certain floor buttons 308 (i.e., floor buttons associated with floors 2-6 in this example). As discussed above for the interface 400, the virtual display 412" of the interface 400" allows the user to preview the selected button arrangement as it would appear on the display 300.

Figure 9:
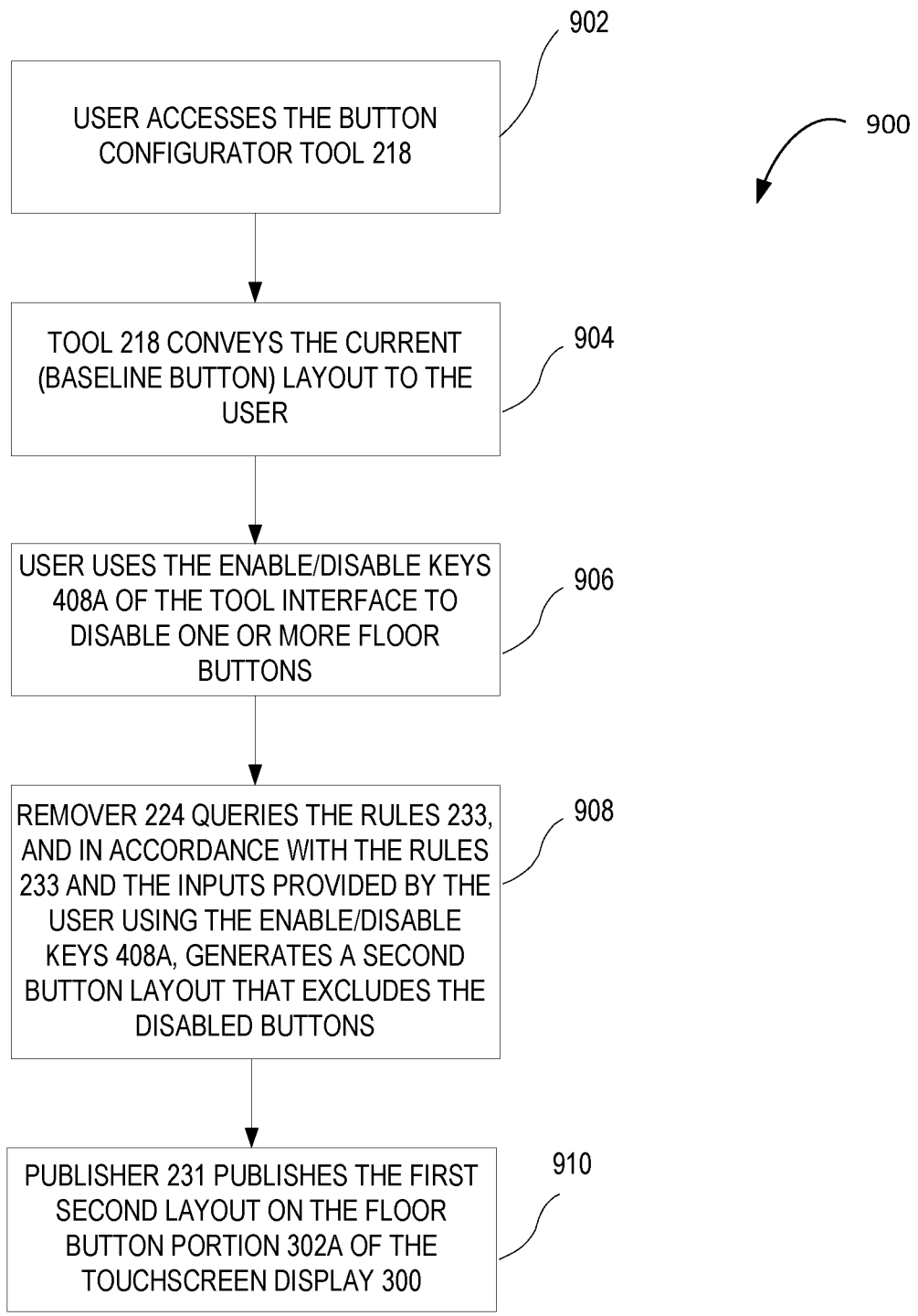
FIG. 9 is a flowchart illustrating a method of using the button configurator tool of FIG. 2 to disable floor buttons on the destination dispatch kiosk.

Focus is directed to FIG. 9, which shows a method 900 of using the button configurator tool 218, and specifically, the remover 224 thereof, to generate a second button layout in response to the removal of one or more of the floor buttons 308 previously appearing on the floor button portion 302A. At step 902, the user may access the button configurator tool 218 (e.g., via a web page, a mobile or computer application, etc.). At step 904, the button configurator tool 218 may convey the current floor button layout to the user. For example, the GUI module 230 may cause to be displayed on the output device 212 the interface 400 (FIG. 4), which shows, among other things, the auto-populated text boxes 410 showing the floor labels, the sizing buttons 408B, the current size of each floor button, the virtual display 412 simulating a kiosk display 300 having the current (e.g., the baseline button) layout, etc.

At step 906, the user may use the enable/disable keys 408A of the kiosk interface to disable one or more floor buttons 308. For example, as shown in FIG. 8, the user may use the enable/disable keys 408A" associated with each of the floors 2-6 to disable the floor buttons 308 associated with these floors.

After the user has disabled one or more floor buttons 308 using the interface 400" at step 906, at step 908, the remover 224 may query the rules 233 and, in accordance with the rules 233 and the inputs provided by the user via the enable/disable keys 408A, generate a second button layout. As can be seen, the second button layout (a preview of which is shown in the virtual display 412" in FIG. 8) may be different from the baseline button layout (shown in FIG. 3).

Generation of the second button layout by the remover 224 may be similar to the generation of the baseline button layout by the configurator 222 as discussed above, except that the remover 224 may additionally take into account the one or more floor buttons 308 disabled by the user. For instance, in the illustrated examples, while the configurator 222 may determine the number of columns and rows of the baseline button layout based on the assumption that the layout is to have fourteen equally sized floor buttons, the remover 224 may determine the number of columns and rows for the second button layout for nine equally sized floor buttons. For example, and as can be seen, because the second button layout (FIG. 8) contains fewer buttons as compared to the baseline button layout (FIG. 3), the second button layout only has three rows and three columns (as opposed to the four rows and four columns of the baseline button layout). Moreover, because the second button layout contains fewer buttons as compared to the baseline button layout, in accordance with the rules 233, the size of each button in the second button layout is greater than the size of each button in the baseline button layout.

A user may, from time to time, find it desirable to include in the button layout a logo (or other image) identifying or associated with a location at a particular floor. For instance, a restaurant, a store, a law firm, etc., may wish for the destination dispatch kiosk 26 to display its logo together with the floor label (e.g., for advertisement, to entice a passenger to visit the particular floor, etc.). The interface 400''' (FIG. 10) of the button configurator tool 218, together with the image superimposing module 228, may allow for a logo (or other image provided by the user) to be superimposed on a floor button.

Figure 10:
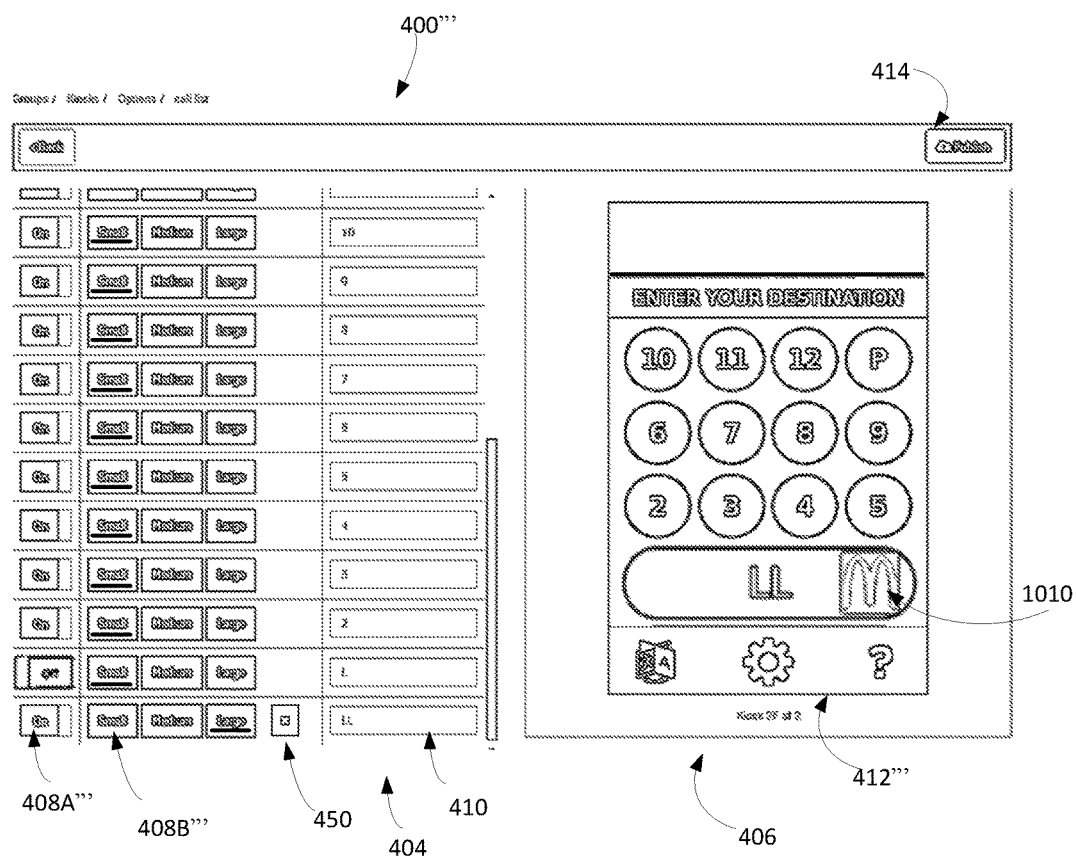
FIG. 10 is a schematic illustrating the interface of the button configurator tool of FIG. 2 being used to superimpose an image on a floor button of the destination dispatch kiosk.
Figure 11:
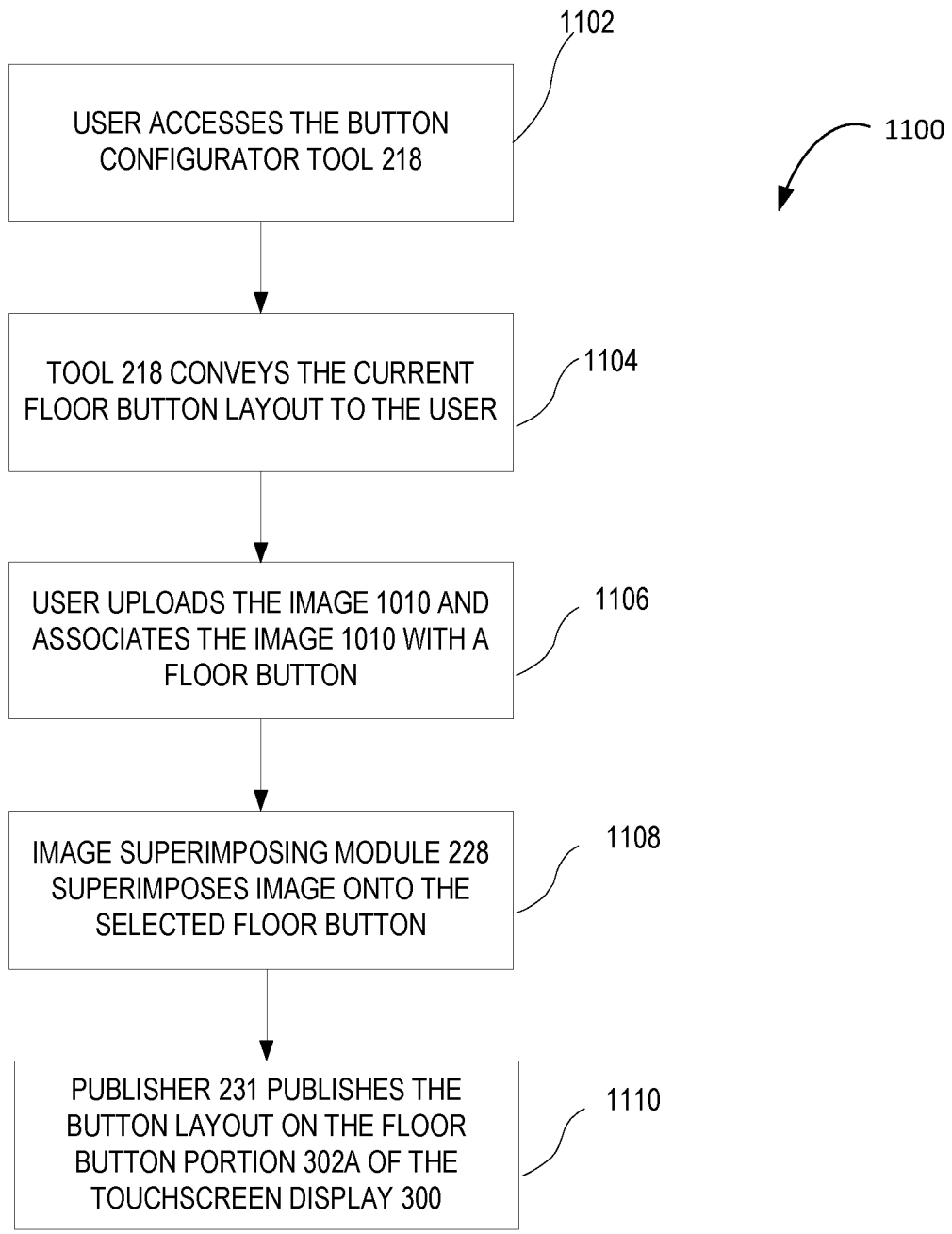
FIG. 11 is a flowchart illustrating a method of using the button configurator tool of FIG. 2 to superimpose an image onto a floor button of the destination dispatch kiosk.

FIG. 11 shows a method 1100 of using the button configurator tool 218, e.g., the image superimposing module 228 thereof, to generate a third button layout in which an image (e.g., the logo 1010 in FIG. 10) is superimposed on a floor button. In some embodiments, the tool 218 may automatically give a user the option to superimpose an image onto a floor button 308 each time the user indicates via the sizing keys 408B that the particular floor button 308 is of a large size. In embodiments, the image superimposing module 228 may only be used to superimpose images onto buttons whose size is greater than a threshold size (e.g., is greater than "small", is greater than "medium", etc.).

To superimpose an image onto a floor button, the user may first access the button configurator tool 218 (e.g., via a web page, a mobile or computer application, etc.) at step 1102. At step 1104, the tool 218 may convey the current floor button layout to the user via the interface 400 (e.g., the interface 400''' shown in FIG. 10). As shown in FIG. 10, assume for the purposes of illustration that the button "L" is currently disabled, and that the user has selected the "large" size for the button "LL."

At step 1106, the user may upload the image 1010 (or another image) into the tool 218 and use the interface 400''' to associate the image 1010 with the desired floor button. For example, as shown in FIG. 10, the user may upload the Thyssenkrupp® logo and associate this logo with the floor LL. In some embodiments, an image attachment identifier 450 (FIG. 10) may indicate that the image has properly been uploaded and associated with a particular floor.

At step 1108, the image superimposing module 228 may superimpose the image (e.g., the image 1010) on the floor button in the third button layout. In embodiments, the image 1010 may be superimposed on one side of the button (e.g., on the right or left side of the button) so that each of the floor label and the logo are visible. As with other embodiments, the virtual display 412''' may allow the user to preview the third button layout, including the image 1010 now included therewith. At step 1110, the image superimposing module 228 may automatically call the publisher 231 (or the user may interact with the publishing key 414 (FIG. 10)) to cause the content generated and configured by the tool 218 to be pushed onto the particular kiosk 26. An elevator passenger may thus be able to view and interact with the third button layout via the display of the kiosk.

Thus, as has been described, the robust button configurator tool 218 may allow for the floor buttons 308 of destination dispatch kiosks 26 to be automatically generated and configured, and may further allow a user to quickly and conveniently modify the floor buttons 308 and floor button layouts of one or more destination dispatch kiosks 26. Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A computer-implemented method for generating and configuring content of an elevator destination dispatch kiosk, said elevator destination dispatch kiosk including a touchscreen display, said touchscreen display having a primary display area, a secondary display area, and an auxiliary display area, said primary display area comprising an instruction portion and a floor button portion, said method comprising:

creating a kiosk database including kiosk data, said kiosk data outlining: (a) a width and a height of said primary display area; and (b) a plurality of destination floors associated with said elevator destination dispatch kiosk;

using a computing structure remote from said elevator destination dispatch kiosk to automatically:
  access said kiosk data in said kiosk database;
  calculate a height of said floor button portion using said height of said primary display area;
  use said calculated height of said floor button portion to calculate a number of rows and columns within said floor button portion for fitting a plurality of floor buttons associated with said plurality of destination floors; and
  generate a floor button layout; and
wirelessly communicating said floor button layout from said computing structure to said elevator destination dispatch kiosk to cause said floor button layout to be published on said touchscreen display;
wherein;
a revised floor button layout is automatically generated in response to one of said plurality of floor buttons being disabled; and
an interface of said computing structure allows said floor button layout to be previewed before said floor button layout is communicated from said computing structure to said elevator destination dispatch kiosk.

2. The computer-implemented method of claim 1, wherein said floor button layout includes said plurality of floor buttons arranged in a pattern within said floor button portion.

3. The computer-implemented method of claim 2, wherein each of said plurality of floor buttons corresponds to one of said plurality of destination floors in said kiosk database.

4. The computer-implemented method of claim 1, further comprising:
  using said computing structure to automatically generate said plurality of floor buttons; and
  using said interface to disable at least one of said plurality of floor buttons in said floor button layout.

5. The computer-implemented method of claim 2, further comprising the step of using said interface to superimpose an image on at least one of said plurality of floor buttons having a floor designation.

6. The computer-implemented method of claim 1, further comprising:
  using said computing structure to automatically generate said plurality of floor buttons; and
  resizing at least one of said plurality of floor buttons in said floor button layout.

7. The computer-implemented method of claim 2, further comprising the step of using a sizing button of said interface to resize at least one of said plurality of floor buttons in said floor button layout before said floor button layout is communicated to said elevator destination dispatch kiosk.

8. The computer-implemented method of claim 2, further comprising the step of using said interface to superimpose a logo on one of said plurality of floor buttons having a floor designation before said floor button layout is communicated to said elevator destination dispatch kiosk.

9. The computer-implemented method of claim 1, wherein said computing structure is a mobile device.

10. A non-transitory computer readable medium with computer executable instructions stored thereon executed by a digital processor to perform the method of generating and configuring content of an elevator destination dispatch kiosk, comprising:
  instructions for retrieving, from a kiosk database, a plurality of destination floors associated with said elevator destination dispatch kiosk;
  instructions for calculating a height of a floor button portion of a touchscreen display of said elevator destination dispatch kiosk;
  instructions for using said calculated height of said floor button portion to calculate a number of rows and columns within said floor button portion for fitting a plurality of floor buttons associated with said plurality of destination floors;
  instructions for automatically generating a floor button layout based on a set of rules;
  instructions for allowing said floor button layout to be previewed before said floor button layout is communicated to said elevator destination dispatch kiosk; and
  instructions for wirelessly communicating said floor button layout to said elevator destination dispatch kiosk to cause said floor button layout to be published on said touchscreen display; and
  instructions for disabling one of said plurality of floor buttons in said floor button layout based on a user input.

11. The computer-readable medium of claim 10, further comprising instructions for incorporating in said floor button layout an image provided by a user.

12. The computer-readable medium of claim 10, further comprising instructions for resizing one of said plurality of floor buttons in said floor button layout based on a user input.

13. A computer-implemented method for generating and configuring content of an elevator destination dispatch kiosk, said elevator destination dispatch kiosk including a touchscreen display, said method comprising:
  creating a kiosk database including kiosk data, said kiosk data outlining a plurality of destination floors associated with said elevator destination dispatch kiosk;
  using a computing structure remote from said elevator destination dispatch kiosk to automatically:
    access said kiosk data in said kiosk database;
    calculate a height of a floor button portion using a height of a primary display area;
    use said calculated height of said floor button portion to calculate a number of rows and columns within said floor button portion for fitting a plurality of floor buttons associated with said plurality of destination floors; and
    generate a floor button layout;
  wirelessly communicating said floor button layout from said computing structure to said elevator destination dispatch kiosk to cause said floor button layout to be published on said touchscreen display;
  wherein, an interface of said computing structure allows said floor button layout to be previewed before said floor button layout is communicated from said computing structure to said elevator destination dispatch kiosk;
  wherein a revised floor button layout is automatically generated in response to one of said plurality of floor buttons being disabled.

14. The computer-implemented method of claim 13, further comprising the step of using said interface to communicate to a user a size of at least one of said plurality of floor buttons in said floor button layout.

15. The computer-implemented method of claim 14, further comprising the step of using said interface to superimpose an image on at least one floor button having a floor designation in said floor button layout.

16. The computer-implemented method of claim 13, further comprising the step of using a sizing button of said interface to resize at least one of said plurality of floor buttons in said floor button layout.

17. The computer-implemented method of claim 13, wherein each of said plurality of floor buttons have the same aspect ratio.

18. The computer-implemented method of claim 13, further comprising:
   obtaining from said kiosk database a size of a first portion of said touchscreen display; and
   using said size of said first portion to calculate a size of a second portion of said touchscreen display.

* * * * *